A. F. POOLE.
ELECTRIC CLOCK SYSTEM.
APPLICATION FILED JUNE 21, 1915.

1,310,374.

Patented July 15, 1919.
2 SHEETS—SHEET 1.

Witnesses:
Jno. H. Nelson

Inventor:
Arthur F. Poole

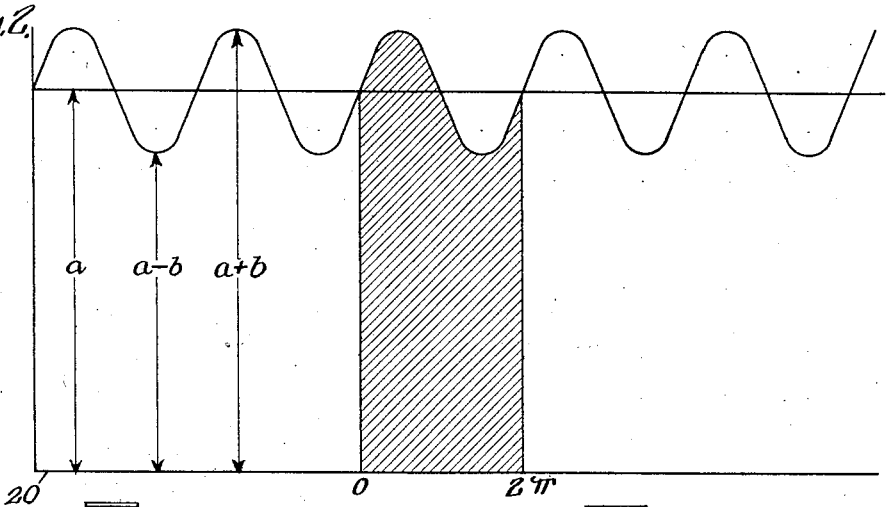
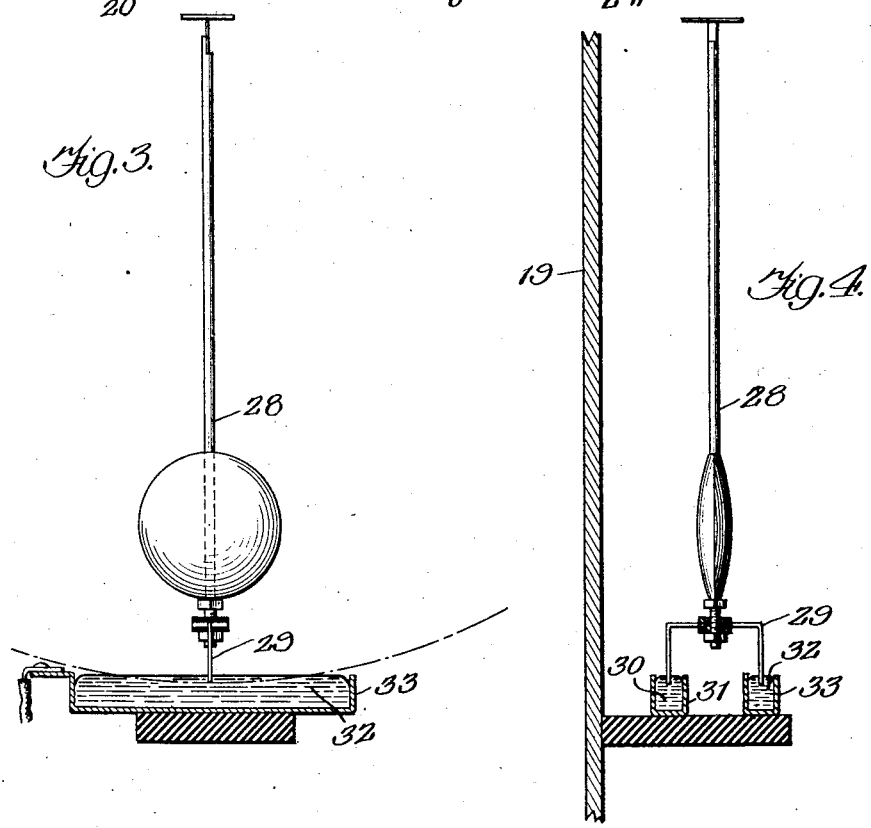

UNITED STATES PATENT OFFICE.

ARTHUR F. POOLE, OF CHICAGO, ILLINOIS.

ELECTRIC-CLOCK SYSTEM.

1,310,374.  Specification of Letters Patent.  Patented July 15, 1919.

Application filed June 21, 1915. Serial No. 35,202.

*To all whom it may concern:*

Be it known that I, ARTHUR F. POOLE, a citizen of the United States, residing at Chicago, in the county of Cook and State of Illinois, have invented certain new and useful Improvements in Electric-Clock Systems, of which the following is a specification.

My invention is an electric clock system, and is designed to permit the attaching of secondary clocks to circuits normally used for the distribution of electric light and power.

My invention will be best understood by reference to the accompanying drawings, of which,—

Fig. 2 is a diagram of the peculiar electric current employed in my system;

Figs. 3 and 4 are diagrammatic views of a circuit-closing arrangement of the master clock.

Figure 1:
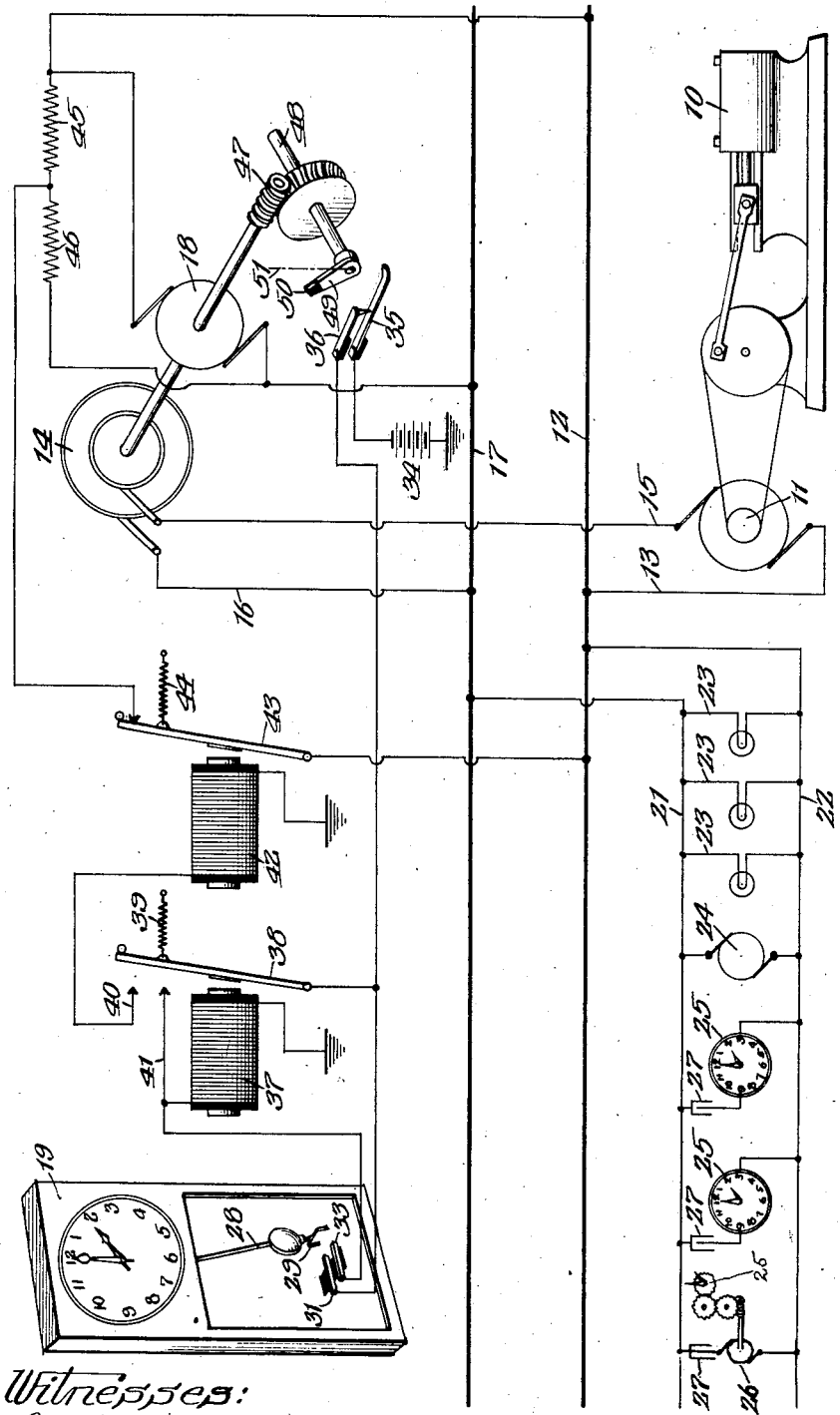
Figure 1 is a diagrammatic arrangement of the circuits and apparatus employed.

Before entering into a detailed description of these figures, I will describe in a general way the operation of my system. I employ a synchronized alternating current for the actuation of the secondary clocks. These secondary clocks contain a small synchronous motor or other device adapted to move in synchronism with an alternating current. I have shown my system as being employed in connection with a direct-current light and power system, and in order to actuate my secondary clocks I superimpose an alternating current upon the direct current, so that on the distribution wires of the light and power system there exists simultaneously a direct current, which serves its usual purpose of furnishing energy to lamps and motors, and also an alternating current, which serves the purpose of actuating the synchronously moving devices used in the secondary clocks. The alternating current which is superimposed upon the direct current is synchronized with a master clock either by hand or, as I have herein shown, automatically. The secondary clocks, of course, will run in synchronism with this alternating current, and therefore will reproduce the time of the master clock.

Referring now to the figures,—

In Fig. 1, 10 represents a steam engine or other prime mover, which serves to drive a direct-current generator 11. One side of this generator is connected to a bus bar 12 by a conductor 13, and the other side is led to one terminal of an alternating-current generator 14 by the conductor 15. The other terminal of the generator 14 is connected by a conductor 16 to the bus bar 17. Power to run the alternating-current generator 14 is furnished by a shunt motor 18, which is synchronized to a master clock 19 in a manner hereinafter to be described. The resulting current which is put on the line may be represented as in Fig. 2, where the base line 20 represents a line of zero potential. Reference to this figure will show that the current which is put on the line consists of a fluctuating direct current. Let $a$ be the potential due to the direct-current generator, and $b$ the maximum potential due to the alternating-current generator. Then the potential of the resulting current will fluctuate from between $a+b$ and $a-b$.

The bus bars 12 and 17 are connected to the line wires 21 and 22, between which are diagrammatically shown a series of lamps 23, a direct-current motor 24 and some secondary clocks 25. One of these secondary clocks as diagrammatically shown consists of a small synchronous motor 26, which is suitably connected by a train of gears to the clock hands. Condensers 27 are connected in series with the secondary clocks for the purpose of forming a bar to the direct current component of the line current. The alternating component of the line current will pass through the condensers without interference, and thus actuate the synchronously moving device 26 in each secondary clock.

I will now describe the means for maintaining the driving motor 18 in synchronism with the master clock 19. This method consists broadly in having an extra resistance in the field of the shunt motor, which resistance is intermittently shunted, with the result of intermittently retarding and accelerating the motor, to thereby keep its average rate of rotation in synchronism with the master clock 19.

The master clock 19 is provided with a device for closing an electric circuit every second. I have diagrammatically shown an arrangement suitable for the purpose in Figs. 3 and 4, reference to which will disclose that the pendulum 28 of the master clock 19 is provided with a U-shaped conductor 29, and this conductor is adapted to make contact with some mercury 30 contained in a trough 31, and also mercury 32 contained in a trough 33, these masses of mercury being set in the path of the U-shaped conductor 29. Thus, at every beat of the pendulum, which is supposed to be a seconds pendulum, an electric circuit will be momentarily closed by the fact of the conductor 29 completing a circuit between the troughs 31 and 33.

Referring now to Fig. 1, it will be seen that a battery 34 has one side connected to ground and the other side connected through a pair of contact springs 35 and 36 to the trough 31. The other trough, 33, is connected through a relay 37 to the ground. The relay 37 is provided with an armature 38, which is adapted to be held in a normal position by a retractile spring 39 and adapted to contact with the contact points 40 and 41. When armature 38 is attracted, a circuit may be traced from the live pole of the battery through the contacts 35 and 36, armature 38, contact 41, relay 37 to the ground. Therefore when the armature 38 is once attracted by the closing of the circuit in the master clock, it will lock itself up until the contact springs 35 and 36 are separated. This will break the locking circuit, and the armature will thereupon fall to its back stop. The contact point 40, adapted to be engaged by the armature 38, is connected through a relay 42 to the ground. The armature 43 of the relay 42 is held in its retracted position by a spring 44, and when in such position serves to shunt the resistance 45, which is in series with the field winding 46 of the motor 18. This field winding 46 is so proportioned that the motor will run somewhat slower than its normal speed. However, when the armature 43 of the relay 42 is pulled up, thereby throwing the resistance 45 in series with the field winding 46, the motor will run somewhat faster than its normal speed. The motor 18 is connected by a worm gear 47 to a shaft 48 carrying an arm 49 having an insulated contact 50 adapted to engage the spring 35 and separate said spring from its contact 36 once in each revolution of the shaft 48. The normal running speed of the motor is so timed that the shaft 48 makes one revolution each second.

The cycle of governing operations by which the motor 18 is kept in synchronism with the master clock 19 is as follows:

Assume that the arm 49 is in the position shown by the dotted line 51 when the master clock closes the circuit, which closure, by the action of the relays 37 and 42, will result in the opening of the shunt around the resistance 45. The motor 18 will thereupon be accelerated, and this acceleration will continue until the arm 49 has separated the contact spring 35 from the spring 36. The separation of the spring 35 from the spring 36 will result in breaking the locking circuit, which has been holding the armature 38 of the relay 37 against its front stops, and said armature will thereupon fall back. This will result in the armature 43 of the relay 42 falling against its back stop, again closing the shunt about the resistance 45. The motor 18 will thereupon run somewhat slower than its normal rate until the arm 49 has reached the position of the dotted line 51. The master clock 19 will again close the circuit, and the cycle of operations will be repeated.

Assume that when the master clock 19 closes the circuit, the arm 49 is not in the position of the dotted line 51, but is at a position ahead of this line. This will correspond to a condition of the motor 18 running fast. From what has been said, it will be evident that the period of acceleration, which lasts from the time the master clock closes the circuit until the contacts 35 and 36 are opened, will be shortened, and the period of deceleration will be lengthened by the same amount. This will result in slowing the average speed of the motor, thereby tending to bring the arm 49 in the line 51 when the circuit is again closed.

In case the motor should run slower than the normal rate, the arm 49 will not have reached the line 51 when the circuit is closed. The period of acceleration will therefore be lengthened and the period of deceleration correspondingly shortened, with the result of increasing the average speed of the motor.

The motor 18 will therefore always keep in synchronism with the master clock 19, and since the motor 18 is rigidly connected to the alternating-current generator 14, the alternating component of the line current will be synchronized also. The secondary clocks 25 will therefore run in unison with the master clock 19.

I wish to note that the fact of the line current having an alternating component will not interfere with the proper operation of either the lights 23 or the motor 24. As far as the lights 23 are concerned, since their action depends upon the heat effect, this effect will be approximately the same in the case of the composite line current as it would be if the alternating component of said current were not present. That this statement is true may be seen in a general way by reference to Fig. 2, in which $a$ represents the direct-current voltage, and the areas above and below the level denoted by $a$ are equal. However, it can be proved that, where $a$ is the voltage of the direct-current component of the line current and $b$ is the maximum voltage of the alternating component, the virtual voltage of the composite current is equal to the square root of the quantity $$a^2 + \frac{b^2}{2}.$$

If $b$ is small as compared to $a$, the virtual voltage will not vary appreciably from the direct-current voltage. As an example, if $a$ is equal to 110 volts, $b$ is equal to 14.14, corresponding to an alternating virtual voltage of 10 volts, then the virtual voltage of the composite current will be 110.4 volts.

From the fact that the virtual voltage of the composite current is substantially that of the line current follows the fact that the energy necessary to run the alternating-current generator 14 is only the energy that is necessary to overcome the frictional losses of this generator.

My improved system herein described is adapted to be used in any system of distribution of electric light and power employing direct current. It may therefore be used to distribute time over cities. All that is necessary is to provide some means at the central station for superimposing an alternating current upon the direct current ordinarily used, and then to synchronize this alternating current with a master clock. Another place in which my system may be used to marked advantage is in independent power plants for office buildings and the like. These power plants are usually run on a direct current, and it will be only necessary by some means to superimpose a synchronized alternating current upon said direct current to make it possible that one may attach a clock at any point on the line wires.

While I have shown the alternating-current generator 14 as one of the means to superimpose the alternating current upon the direct current, it is obvious that a transformer may be used, or that the ordinary generator 11 may be specially constructed, so that, instead of giving out an unvarying direct current, it may give out a pulsating current such as is shown in Fig. 2. Various methods of impressing an alternating and direct electromotive force simultaneously upon a pair of conductors are well-known in the art. Specific instances of such methods are disclosed in Patent No. 695,529 to Bedell, and also in Patent No. 503,321 to Hunter. Any of the methods therein shown may be used to carry out my invention, by synchronizing the alternating or pulsating current with a master clock and connecting secondary clocks containing a synchronously moving element responsive to such pulsating current across the line wires.

While I have shown but a single generator 11 connected to the bus bars, it is obvious that if the bus bars were supplied with a plurality of generators, it would be only necessary to supply each one of these generators with an alternating-current generator 14 and synchronize one of said alternating-current generators. The synchronization of this one will keep all the remainder of the generators in step with it.

Since the entire line current must pass through the alternating generator 14, it is of course desirable that the resistance of this generator be kept as low as possible. Practically the only energy losses in this system are the $C^2R$ losses occurring in the alternating generator 14.

Attention is directed to the fact that the electric clock systems of the prior art all require a separate pair of conductors for the current designed to actuate secondary clocks. In my herein described invention I utilize line conductors which are already in existence for the purpose of distributing light and power. I impress an alternating current upon said conductors thereby changing the current normally upon said conductors from a direct to a pulsating one, synchronize said pulsating current with a master clock and then it is possible to have a secondary clock at any point of the system without the necessity of running a separate conductor therefor. This characteristic of my invention is of course of great advantage in that it obviates the necessity of wiring a building for an electric clock system in case it is desired to install one therein.

In some of the claims I have referred to a pulsating electromotive force and also to a pulsating current. By these terms I mean a direct current which varies its electromotive force, but which always flows in the same direction, and always has an appreciable voltage at its minimum, as distinguished from a true alternating current which flows in one direction for one instant, passes through zero and flows in the reverse direction the next instant.

Many changes and modifications may be made in the precise arrangement herein shown without departing from the spirit of my invention, since I claim:

1. In an electric clock system, the combination of a master clock, a pair of line conductors, means for impressing a uni-directional electromotive force thereon, means for impressing an alternating electromotive force simultaneously thereon, means for synchronizing said alternating electromotive force with said master clock and a secondary clock responsive to one of said currents but not responsive to the other.

2. In an electric clock system, the combination of a master clock, a pair of line conductors, means for impressing a uni-directional electromotive force thereon, means for impressing an alternating electromotive force simultaneously thereon, means for automatically synchronizing said alternating electromotive force with said master clock and a secondary clock responsive to one of said currents but not responsive to the other.

3. In an electric clock system, the combination of a master clock, line conductors, means for impressing a uni-directional electromotive force on said line conductors, means for simultaneously impressing an alternating electromotive force on said conductors, means for synchronizing the alternations of said electromotive force with said master clock and a secondary clock connected to said conductors, said clock including elements moving synchronously with said alternating electromotive force.

4. In an electric clock system, line conductors, means for impressing a unidirectional electromotive force thereon, means for simultaneously impressing an alternating electromotive force on said conductors, a master clock, means for synchronizing said alternating electromotive force impressing means with said master clock, and a secondary clock comprising an element operable by said alternating electromotive force in synchronism with the frequency of said electromotive force.

5. In an electric clock system, line conductors, means for impressing unidirectional electromotive force on said line conductors, means for simultaneously impressing an alternating electromotive force on said conductors, a master clock, means for synchronizing said alternating electromotive force with said master clock and a secondary clock including an element operable by and moving synchronously with the frequency of said alternating electromotive force and having a condenser in series therewith connected to said conductors.

6. The combination of a pair of conductors, means for impressing both a direct and an alternating electromotive force simultaneously thereon, a clock, and means to synchronize the frequency of said alternating electromotive force with said clock and a secondary clock operable by said alternating electromotive force connected to said conductors.

7. The combination of a pair of conductors, means for impressing both a direct and an alternating electromotive force simultaneously thereon, a clock, and automatic means to synchronize the frequency of said alternating electromotive force with said clock and a secondary clock operable by said alternating electromotive force connected to said conductors.

8. The combination of a pair of conductors, means for impressing both a direct and an alternating electromotive force simultaneously thereon, a clock, and automatic electrically operated means to synchronize the frequency of said alternating electromotive force with said clock and a secondary clock operable by said alternating electromotive force connected to said conductors.

9. The combination of a pair of conductors, means for impressing a pulsating electromotive force thereon, a clock, and means to synchronize the pulsations of said electromotive force with said clock and a secondary clock operated by said pulsating electromotive force connected to said conductors.

10. The combination of a pair of conductors, means for impressing a pulsating electromotive force thereon, a clock, and automatic means to synchronize the pulsations of said electromotive force with said clock and a secondary clock operated by said pulsating electromotive force connected to said conductors.

11. The combination of a pair of conductors, means for impressing a pulsating electromotive force thereon, a clock, and automatic electrically operated means to synchronize the pulsations of said electromotive force with said clock and a secondary clock operated by said pulsating electromotive force connected to said conductors.

12. In combination, line conductors, of a commercial power distributing system, a source of pulsating current, a master clock, secondary clocks connected to said conductors and controlled by said current and means to synchronize said pulsating current with said master clock.

13. In combination, line conductors, of a commercial power distributing system, a source of pulsating current, a master clock, secondary clocks connected to said conductors and controlled by said current and automatic means to synchronize said pulsating current with said master clock.

14. In combination, line conductors, of a commercial power distributing system, a source of pulsating current, a master clock, secondary clocks connected to said conductors and controlled by said current, and automatic electrically operated means to synchronize said pulsating current with said master clock.

In witness whereof, I hereunto subscribe my name this 19th day of June, A. D. 1915.

ARTHUR F. POOLE.